US011099566B2

(12) United States Patent
Woodrow et al.

(10) Patent No.: US 11,099,566 B2
(45) Date of Patent: Aug. 24, 2021

(54) SYSTEMS AND METHODS FOR PROVIDING A VEHICLE SERVICE VIA A TRANSPORTATION NETWORK FOR AUTONOMOUS VEHICLES

(71) Applicant: UATC, LLC, San Francisco, CA (US)

(72) Inventors: Alden James Woodrow, Oakland, CA (US); Robert Evan Miller, San Mateo, CA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 16/799,040

(22) Filed: Feb. 24, 2020

(65) Prior Publication Data

US 2020/0264611 A1    Aug. 20, 2020

Related U.S. Application Data

(63) Continuation of application No. 15/850,398, filed on Dec. 21, 2017, now Pat. No. 10,571,917.
(Continued)

(51) Int. Cl.
*G05D 1/08* (2006.01)
*G06Q 10/08* (2012.01)
(Continued)

(52) U.S. Cl.
CPC ....... *G05D 1/0088* (2013.01); *G01C 21/3492* (2013.01); *G05D 1/0291* (2013.01);
(Continued)

(58) Field of Classification Search
CPC ............. G01C 21/3492; G05D 1/0088; G05D 1/0291; G06Q 10/047; G06Q 10/08; G06Q 50/28; G06Q 50/30
See application file for complete search history.

(56) References Cited

U.S. PATENT DOCUMENTS 8,874,360 B2    10/2014 Klinger et al.
9,384,666 B1 *   7/2016 Harvey ................ G05D 1/0088
(Continued)

OTHER PUBLICATIONS

Search Report and Written Opinion for PCT/US2018/059934, dated Jan. 18, 2019, 13 pages.
(Continued)

*Primary Examiner* — Tyler J Lee
(74) *Attorney, Agent, or Firm* — Dority & Manning, P.A.

(57) ABSTRACT

Systems and methods for providing a vehicle service are provided. In one example embodiment, a computer-implemented method includes receiving data indicative of a service request to provide a vehicle service for an entity with respect to one or more cargo items designated for autonomous transport. The method includes obtaining a first cargo item among the one or more cargo items, from a representative of the entity at a dedicated first transfer hub proximate to a first location associated with the first cargo item. The method includes controlling a first autonomous vehicle to transport the first cargo item from the first transfer hub to a dedicated second transfer hub proximate to a second location associated with the first cargo item. The method includes providing the first cargo item to a representative of the entity at the second transfer hub, to provide the vehicle service.

20 Claims, 13 Drawing Sheets

Related U.S. Application Data

(60) Provisional application No. 62/584,268, filed on Nov. 10, 2017.

(51) Int. Cl.

| | | |
|---|---|---|
| *G06Q 10/04* | (2012.01) | |
| *G01C 21/34* | (2006.01) | |
| *G05D 1/02* | (2020.01) | |
| *G06Q 50/28* | (2012.01) | |
| *G06Q 50/30* | (2012.01) | |
| *G05D 1/00* | (2006.01) | |

(52) U.S. Cl.
CPC ............ *G06Q 10/047* (2013.01); *G06Q 10/08* (2013.01); *G06Q 50/28* (2013.01); *G06Q 50/30* (2013.01)

(56) References Cited

U.S. PATENT DOCUMENTS

| | | |
|---|---|---|
| 9,387,928 B1 | 7/2016 | Gentry et al. |
| 9,552,564 B1 | 1/2017 | Martenis |
| 9,741,010 B1 * | 8/2017 | Heinla ................. G06Q 10/083 |
| 10,252,659 B2 * | 4/2019 | Healey ................. G06Q 10/083 |
| 10,309,792 B2 * | 6/2019 | Iagnemma ......... G01C 21/3461 |
| 10,514,690 B1 * | 12/2019 | Siegel .................... G01C 23/00 |
| 10,546,268 B2 * | 1/2020 | Doherty ............... G08G 5/0034 |
| 10,570,000 B2 * | 2/2020 | High ...................... G05D 1/028 |
| 10,681,513 B2 * | 6/2020 | Iagnemma ............... H04W 4/70 |
| 10,789,567 B1 * | 9/2020 | Ur ....................... G06Q 10/0832 |
| 10,857,994 B2 * | 12/2020 | Iagnemma ......... G01C 21/3407 |
| 2013/0002456 A1 | 1/2013 | Fuller et al. |
| 2013/0240673 A1 | 9/2013 | Schlosser et al. |
| 2014/0207701 A1 | 7/2014 | Kadaba |
| 2014/0254896 A1 | 9/2014 | Zhou et al. |
| 2015/0006005 A1 | 1/2015 | Yu et al. |
| 2015/0332206 A1 | 11/2015 | Trew et al. |
| 2015/0379468 A1 | 12/2015 | Harvey |
| 2016/0209843 A1 | 7/2016 | Meuleau et al. |
| 2016/0334797 A1 | 11/2016 | Ross et al. |
| 2016/0379167 A1 | 12/2016 | Raman |
| 2017/0132934 A1 | 5/2017 | Kentley et al. |
| 2017/0294130 A1 | 10/2017 | Donnelly |
| 2017/0300855 A1 | 10/2017 | Lund et al. |
| 2018/0281657 A1 * | 10/2018 | Healey ............... G06Q 30/0241 |
| 2019/0130342 A1 | 5/2019 | Maheshwari et al. |
| 2019/0130349 A1 | 5/2019 | Ferguson et al. |

OTHER PUBLICATIONS

Steve Viscelli, "Energy Policy Research", https://www.steveviscelli.com/policy-research, retrieved on May 11, 2020, 2 pages.

Business Wire, "Embark, Frigidaire®, and Ryder Partner to Pilot Automated Driving Technology", Nov. 13, 2017, https://www.businesswire.com/news/home/20171112005077/en/Embark-Frigidaire%C2%AE-Ryder-Partner-Pilot-Automated-Driving, retrieved on May 11, 2020, 2 pages.

* cited by examiner

SYSTEMS AND METHODS FOR PROVIDING A VEHICLE SERVICE VIA A TRANSPORTATION NETWORK FOR AUTONOMOUS VEHICLES

PRIORITY CLAIM

The present application is a continuation of U.S. application Ser. No. 15/850,398 having a filing date of Dec. 21, 2017, issued as U.S. Pat. No. 10,571,917 which claims the benefit of U.S. Provisional Application Ser. No. 62/584,268 filed Nov. 10, 2017. Applicant claims priority to and the benefit of each of such applications and incorporate all such applications herein by reference in its entirety.

FIELD

The present disclosure relates generally to providing a vehicle transportation service.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for providing a vehicle service. The method includes receiving, by one or more computing devices, data indicative of a service request to provide a vehicle service for an entity with respect to one or more cargo items designated for autonomous transport. The method includes obtaining, by the one or more computing devices, a first cargo item among the one or more cargo items, from a representative of the entity at a dedicated first transfer hub proximate to a first location associated with the first cargo item. The method includes controlling, by the one or more computing devices, a first autonomous vehicle to transport the first cargo item from the first transfer hub to a dedicated second transfer hub proximate to a second location associated with the first cargo item. The method includes providing, by the one or more computing devices, the first cargo item to a representative of the entity at the second transfer hub, to provide the vehicle service.

Another example aspect of the present disclosure is directed to a computer-implemented method for managing a fleet of vehicles to provide a vehicle transportation service. The method includes obtaining, by one or more computing devices, data indicative of one or more assets designated for autonomous transportation. The method includes obtaining, by the one or more computing devices, data indicative of one or more autonomous vehicles in a fleet. The method includes determining, by the one or more computing devices, a first transfer hub and a second transfer hub for each of the one or more assets. The method includes scheduling, by the one or more computing devices, each of the one or more assets for autonomous transportation by an autonomous vehicle in the fleet. The method includes controlling, by the one or more computing devices, the one or more autonomous vehicles to autonomously transport an asset from a respective first transfer hub to a respective second transfer hub.

Another example aspect of the present disclosure is directed to a computer-implemented method for providing a multi-mode vehicle transportation service. The method includes obtaining, by one or more computing devices, data indicative of cargo item to be transported from a first location to a second location. The method includes determining, by the one or more computing devices, a first transfer hub to transport the cargo item from the first location via a manual mode. The method includes determining, by the one or more computing devices, a second transfer hub to transport the cargo item to the second location via a manual mode. The method includes determining, by the one or more computing devices, a transportation route to transport the cargo item from the first transfer hub to the second transfer hub via an autonomous mode. The method includes controlling, by the one or more computing devices, an autonomous vehicle to autonomously transport the cargo item from the first transfer hub to the second transfer hub, to provide the multi-mode vehicle transportation service.

Another example aspect of the present disclosure is directed to a computer-implemented method for providing a multi-mode vehicle transportation service. The method includes receiving, by one or more computing devices, a service request from an entity for transporting a cargo item, the service request indicating a point-of-origin for the cargo item and a point-of-delivery for the cargo item. The method includes determining, by the one or more computing devices, a first transfer hub located relative to the point-of-origin for receiving the cargo item from a representative of the entity. The method includes determining, by the one or more computing devices, a second transfer hub located relative to the point-of-delivery for delivering the cargo item to a representative of the entity. The method includes determining, by the one or more computing devices, a transportation route to transport the cargo item from the first transfer hub to the second transfer hub via an autonomous mode. The method includes controlling, by the one or more computing devices, an autonomous vehicle to autonomously transport the cargo item from the first transfer hub to the second transfer hub.

Another example aspect of the present disclosure is directed to a computing system for providing a vehicle service. The computing system includes one or more processors and one or more tangible, non-transitory, computer readable media that collectively store instructions that when executed by the one or more processors cause the computing system to perform operations. The operations include receiving data indicative of a service request to provide a vehicle service for an entity with respect to one or more cargo items designated for autonomous transport. The operations include obtaining a first cargo item among the one or more cargo items, from a representative of the entity at a dedicated first transfer hub proximate to a first location associated with the first cargo item. The operations include controlling a first autonomous vehicle to transport the first cargo item from the first transfer hub to a dedicated second transfer hub proximate to a second location associated with the first cargo item. The operations include providing the first cargo item to a representative of the entity at the second transfer hub, to provide the vehicle service.

Another example aspect of the present disclosure is directed to a computing system for managing a fleet of vehicles to provide a vehicle transportation service. The computing system includes one or more processors and one or more tangible, non-transitory, computer readable media that collectively store instructions that when executed by the one or more processors cause the computing system to perform operations. The operations include obtaining data indicative of one or more assets designated for autonomous transportation. The operations include obtaining data indicative of one or more autonomous vehicles in a fleet. The operations include determining a first transfer hub and a second transfer hub for each of the one or more assets. The operations include scheduling each of the one or more assets for autonomous transportation by an autonomous vehicle in the fleet. The operations include controlling the one or more autonomous vehicles to autonomously transport an asset from a respective first transfer hub to a respective second transfer hub.

Another example aspect of the present disclosure is directed to a computing system for providing a multi-mode vehicle transportation service. The computing system includes one or more processors and one or more tangible, non-transitory, computer readable media that collectively store instructions that when executed by the one or more processors cause the computing system to perform operations. The operations include obtaining data indicative of cargo item to be transported from a first location to a second location. The operations include determining a first transfer hub to transport the cargo item from the first location via a manual mode. The operations include determining a second transfer hub to transport the cargo item to the second location via a manual mode. The operations include determining a transportation route to transport the cargo item from the first transfer hub to the second transfer hub via an autonomous mode. The operations include controlling an autonomous vehicle to autonomously transport the cargo item from the first transfer hub to the second transfer hub, to provide the multi-mode vehicle transportation service.

Yet another example aspect of the present disclosure is directed to a computing system for providing a multi-mode vehicle transportation service. The computing system includes one or more processors and one or more tangible, non-transitory, computer readable media that collectively store instructions that when executed by the one or more processors cause the computing system to perform operations. The operations include receiving a service request from an entity for transporting a cargo item, the service request indicating a point-of-origin for the cargo item and a point-of-delivery for the cargo item. The operations include determining a first transfer hub located relative to the point-of-origin for receiving the cargo item from a representative of the entity. The operations include determining a second transfer hub located relative to the point-of-delivery for delivering the cargo item to a representative of the entity. The operations include determining a transportation route to transport the cargo item from the first transfer hub to the second transfer hub via an autonomous mode. The operations include controlling an autonomous vehicle to autonomously transport the cargo item from the first transfer hub to the second transfer hub.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIGS. 4-1 to 4-16 depict examples of an autonomous vehicle providing a vehicle service according to example embodiments of the present disclosure;

FIG. 5 depicts a flow diagram of an example method for providing a vehicle service according to example embodiments of the present disclosure;

FIG. 6 depicts a flow diagram of an example method for managing a fleet of vehicles to provide a vehicle service according to example embodiments of the present disclosure; and FIG. 7 depicts example system components according to example embodiments of the present disclosure.

Figure 1:
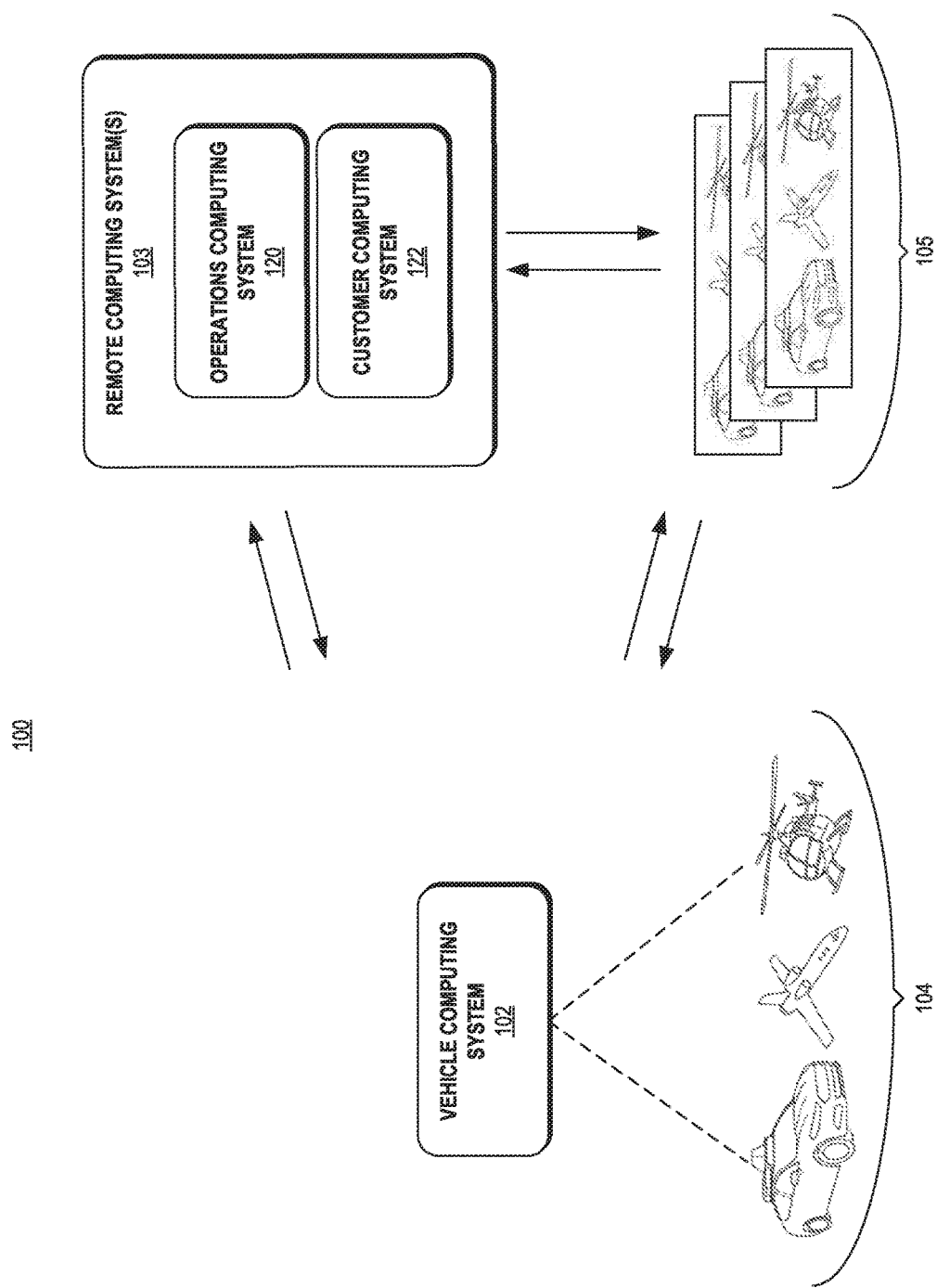
FIG. 1 depicts an example system overview according to example embodiments of the present disclosure.

Reference numerals that are repeated across plural figures are intended to identify the same components or features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing a vehicle service to transport cargo from a first location to a second location. A service provider can use a fleet of vehicles to provide a vehicle transportation service across a plurality of locations that include the first and second locations. The fleet of vehicles can include one or more autonomous vehicles that can drive, navigate, operate, etc. with minimal and/or no interaction from a human driver. The plurality of locations can each be associated with a proximate transfer hub among a plurality of transfer hubs. The plurality of transfer hubs can be linked via a plurality of transportation routes such that each transfer hub is linked with at least one other transfer hub, to create a network of transportation routes (e.g., transportation network). The service provider can control an autonomous vehicle in its fleet to navigate from a first transfer hub to a second transfer hub among the plurality of transfer hubs, to autonomously transport the cargo.

As an example, a service provider can provide a vehicle transportation service to autonomously transport cargo from a first location to a second location. The first location can be a point of origin of the first cargo, and the second location can be a point of delivery of the first cargo. The service provider can determine a first transfer hub proximate to the first location, a second transfer hub proximate to the second location, and a transportation route connecting the first transfer hub to the second transfer hub. The service provider can control a first autonomous vehicle in its fleet to pick-up the cargo at the first transfer hub, transport the cargo from the first transfer hub to the second transfer hub based on the transportation route, and drop-off the cargo at the second transfer hub.

As another example, a service provider can provide a vehicle transportation service to autonomously transport a plurality of assets from a respective first location to a respective second location. The plurality of assets can each include one or more cargo items. The service provider can determine, for each asset, a first transfer hub proximate to the first location, a second transfer hub proximate to the second location, and a transportation route connecting the first transfer hub to the second transfer hub. The service provider can obtain a status of one or more autonomous vehicles in its fleet (e.g., location, diagnostics information, a vehicle service being provided, a requesting/recipient entity of each vehicle service, etc.), and allocate the plurality of assets among the one or more autonomous vehicles for autonomous transport, to provide the vehicle transportation service. In particular, the service provider can schedule each of the plurality of assets to be transported by one of the autonomous vehicles in its fleet. The service provider can monitor a status of the fleet to optimize an allocation of the plurality of assets to maximize an efficiency for providing the vehicle transportation service and to maximize a utilization of its fleet.

Aspects of the present disclosure can provide a system (e.g., a computing system), and methods for controlling the same, to provide a vehicle transportation service to autonomously transport cargo from a first location to a second location. Aspects of the present disclosure can also provide systems and methods for managing a fleet of vehicles to provide a vehicle transportation service to autonomously transport a plurality of assets from a respective first location to a respective second location.

In some embodiments, the computing system can include one or more processors, and one or more tangible, non-transitory media that collectively store data indicative of one or more autonomous vehicles (e.g., fleet status information), a transportation network, and one or more cargo items designated for autonomous transport. The one or more cargo items can include a trailer (e.g., intermodal container) and/or one or more items within a trailer. The computing system can schedule a plurality of cargo items for autonomous transportation over the transportation network via the one or more autonomous vehicles.

In some embodiments, the computing system can include a communications system that allows the computing system to communicate with one or more other computing systems (e.g., a vehicle computing system, a customer computing system, etc.). The one or more other computing systems can be remote from the computing system. For example, the computing system can communicate with a vehicle computing system of an autonomous vehicle to control the autonomous vehicle to transport a cargo item. As another example, the computing system can communicate with a customer computing system to obtain data indicative of one or more cargo items designated for autonomous delivery.

A service provider can use the computing system to control one or more vehicles to provide a vehicle service, such as a transportation service. The vehicles can be autonomous vehicles that include various systems and devices configured to control the operation of the vehicle. For example, an autonomous vehicle can include an on-board vehicle computing system for operating the vehicle (e.g., located on or within the autonomous vehicle). The vehicle computing system can receive sensor data from sensor(s) on-board the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, an autonomous vehicle can communicate with an operations computing system (e.g., service provider). The operations computing system can help the service provider monitor, communicate with, manage, etc. the fleet of vehicles. As another example, the autonomous vehicle can communicate with a customer computing system associated with a customer. As yet another example, the autonomous vehicle can communicate with a computing system of one or more other autonomous vehicles. In some implementations, the operations computing system can mediate communication between the autonomous vehicle and other remote computing systems (e.g., customer computing system, vehicle computing system of one or more other autonomous vehicles, etc.).

A service provider can provide a vehicle service in response to a service request to provide the vehicle service. The service provider can receive/obtain the service request from a requesting entity (e.g., customer) who requests the vehicle service. For example, a service provider can receive/obtain a service request from a customer via a computing system of the customer. The service request can indicate one or more cargo items designated for autonomous transport. Additionally, or alternatively, the service request can indicate criteria for designating one or more cargo items for autonomous transport. In some implementations, the service request can include a request for a service subscription. The service subscription can be governed by a subscription agreement between the service provider and a requesting entity.

A service provider can obtain data indicative of each designated cargo item, such as, for example, a point of origin, point of delivery, and/or current location. The point of origin can correspond to a starting location of the cargo item (e.g., a sender's address, shipping address, etc.), and the point of delivery can correspond to a final location of the cargo item (e.g., a recipient's address, delivery address, etc.). The current location can be initialized to the point of origin and periodically updated to reflect a new location of the cargo item. For example, before a designated cargo item is transported, a current location of the cargo item can be set to a point of origin of the cargo item. When the designated cargo item is being transported, a current location of the cargo item can be set to a transfer hub (e.g., most recent transfer hub along one or more transportation routes that link the first transfer hub to the second transfer hub). After the designated cargo item is delivered to its point of delivery, a current location of the cargo item can be set to a point of delivery of the cargo item.

A location of a point of origin and a location of a point of delivery for each of the plurality of cargo items, and a location of each of the plurality of transfer hubs, can be associated with a navigation score. The navigation score can indicate an ease of navigation at, near, or to the respective location. A location associated with a high score can indicate that navigation (e.g., autonomous navigation) at, near, or to the location is relatively easy. A location associated with a low score can indicate that navigation (e.g., autonomous navigation) at, near, or to the location is relatively difficult. For example, a location proximate to a dense urban area can be associated with a low navigation score because of high congestion, complex intersections, frequent traffic stops, poor infrastructure, etc. As another example, a location proximate to a mountain top can be associated with a low navigation score because of limited accessibility, dangerous terrain, etc. As yet another example, a location proximate to a multi-lane highway can be associated with a high navigation score because of an ease of access to the multi-lane highway, an availability of reserved/private access lanes to enter/exit the highway, etc.

A transfer hub among the plurality of transfer hubs can be intentionally placed or selected at a location associated with a high navigation score. In particular, a point of origin and/or a point of delivery for each of the plurality of cargo items can be associated with a proximate transfer hub. A transfer hub can be placed or selected at a location with a higher navigation score with respect to a location of one or more points of origin or one or more points of delivery proximate to the transfer hub.

A service provider can transport a designated cargo item from a first location associated with the cargo item to a second location associated with the cargo item. In some implementations, the first location can be a point of origin of the cargo item and the second location can be a point of delivery of the cargo item. In some implementations, the first location can be a first transfer hub proximate to a point of origin of the cargo item and the second location can be a second transfer hub proximate to a point of delivery of the cargo item. For example, a vehicle transportation service customer can be a carrier entity responsible for transporting a cargo item from its point of origin to its point of delivery. The carrier entity can own and/or operate one or more vehicles that can transport the cargo item between (to/from) its point of origin or delivery and a transfer hub proximate to the point of origin or delivery. The carrier entity can transport the cargo item from its point of origin to a first transfer hub and hand-off the cargo item to a provider of the vehicle transportation service (e.g., service provider). The service provider can pick-up the cargo item at the first transfer hub and transport the cargo item to a second transfer hub. The service provider can drop-off the cargo item at the second transfer hub and hand-off the cargo item to the carrier entity. The carrier entity can then transport/deliver the cargo item from the second transfer hub to the point of delivery.

A service provider can determine a transportation route for autonomously transporting a designated cargo item. The transportation route can link two transfer hubs in a transportation network (e.g., a first transfer hub to a second transfer hub, a first transfer hub to an intermediate transfer hub, an intermediate transfer hub to another intermediate transfer hub, an intermediate transfer hub to a second transfer hub, etc.). The service provider can determine the transportation route based on a first transfer hub proximate to a first location associated with the designated cargo item and a second transfer hub proximate to a second location associated with the designated cargo item.

In some implementations, the service provider can determine a transportation route based on a first transfer hub proximate to a current location of the designated cargo item. For example, if a current location of a cargo item is a transfer hub, then the service provider can determine a transportation route from that transfer hub to a second transfer hub proximate to a point of delivery of the cargo item. The service provider can update a current location of the cargo item as the cargo item is transported.

In some implementations, the service provider can determine a transportation route based one or more intermediate transfer hubs. In particular, the service provider can determine one or more transportation routes that link the first transfer hub to the second transfer hub via the one or more intermediate transfer hubs. For example, a service provider can autonomously transport a cargo item from a first transfer hub to an intermediate transfer hub (e.g., a transfer hub that is not proximate to a point of delivery of the cargo item), and subsequently transport the cargo item from the intermediate transfer hub to a second transfer hub.

A transfer hub can include a loading zone, launch zone, and landing zone. A designated cargo item can be transported from its point of origin to a loading zone of the first transfer hub. For example, the designated cargo item can be transported by a customer's vehicle. The customer's vehicle can be a vehicle owned and operated by the customer, an agent of the customer, an independent contractor, or some combination thereof that represents or is associated with the customer.

At the loading zone, the designated cargo can be unhitched from a customer's vehicle, and hitched to an autonomous vehicle selected by the service provider to autonomously transport the designated cargo item. When the designated cargo item is unhitched, the service provider can control a selected autonomous vehicle to pick-up the designated cargo item. As an example, if a selected autonomous vehicle is at the loading zone when the designated cargo is unhitched, then the designated cargo can be hitched to the selected autonomous vehicle. As another example, if a selected autonomous vehicle is not at the loading zone when the designated cargo is unhitched, then the service provider can control the selected autonomous vehicle to travel to the loading zone. The designated cargo can be stored at the loading zone until the selected autonomous vehicle arrives. In some implementations, the selected autonomous vehicle can arrive at a landing zone of the first transfer hub. The customer, an agent of the customer, an independent contractor, or some combination thereof can manually operate the selected autonomous vehicle to drive from the landing zone to the loading zone. At the loading zone, the designated cargo can be hitched to the selected autonomous vehicle.

A service provider can determine when a designated cargo is hitched to a selected autonomous vehicle. When the service provider determines that the designated cargo is hitched to the selected autonomous vehicle, the service provider can control the selected autonomous vehicle to travel to the launch zone. The launch zone can include access to an on-ramp for entering a highway. In some implementations, a customer, an agent of the customer, an independent contractor, or some combination thereof can manually operate the selected autonomous vehicle to drive it from the loading zone to the launch zone. The launch zone of the first transfer hub can be associated with a higher navigation score with respect to the loading zone of the first transfer hub.

When the selected autonomous vehicle arrives at the launch zone of the first transfer hub, the service provider can control the selected autonomous vehicle to autonomously navigate from the launch zone to a landing zone of the second transfer hub. The landing zone of the second transfer hub can include access to an off-ramp for exiting the highway. The selected autonomous vehicle can autonomously navigate onto the highway via the on-ramp at the launch zone of the first transfer hub, and travel to the landing zone of the second transfer hub via the off-ramp at the landing zone of the second transfer hub.

When the selected autonomous vehicle arrives at the landing zone of the second transfer hub, the service provider can control the selected autonomous vehicle to drop-off the designated cargo. The landing zone of the second transfer hub can be associated with a higher navigation score with respect to the loading zone of the second transfer hub. The service provider can control the selected autonomous vehicle to autonomously navigate from the landing zone to a loading zone of the second transfer hub. In some implementations, a customer, an agent of the customer, an independent contractor, or some combination thereof can manually operate the selected autonomous vehicle to drive it from the landing zone to the loading zone. At the loading zone of the second transfer hub, the designated cargo item can be unhitched from the selected autonomous vehicle. In some implementations, a customer, an agent of the customer, an independent contractor, or some combination thereof can unhitch the designated cargo item from the selected autonomous vehicle, and subsequently hitch the designated cargo item to a customer's vehicle to transport from the second transfer hub to a point of delivery.

In some implementations, a transfer hub can include one or more maintenance zones, one or more inspection zones, and/or other designated zones. A maintenance zone can include facilities and/or personnel to provide a maintenance service for an autonomous vehicle. For example, a service provider can control an autonomous vehicle to travel to a maintenance zone at periodic intervals for a scheduled oil change, emissions test, instrument calibration, etc. As another example, an autonomous vehicle can detect a fault in one or more components of the vehicle, and in response the autonomous vehicle or a service provider can schedule maintenance at a maintenance zone of the nearest transfer hub. The inspection zone can include facilities and/or personnel to inspect an autonomous vehicle. At the inspection zone, the autonomous vehicle can be inspected to confirm a weight of an attached cargo item, whether the attached cargo item is securely and properly attached to the autonomous vehicle, whether the autonomous vehicle has enough fuel, and/or that other inspection criteria is satisfied. For example, an autonomous vehicle can stop at an inspection zone on its way from a loading zone to a launch zone of a transfer hub (before the autonomous vehicle leaves the loading zone, in between the loading zone and launch zone, after the autonomous vehicle arrives at the launch zone). As another example, an autonomous vehicle can stop at an inspection zone when it arrives at a transfer hub.

The systems and methods described herein may provide a number of technical effects and benefits. By utilizing one or more dedicated transfer hubs proximate to highway on/off ramps, a fleet of vehicles can be used to provide a vehicle service, while avoiding regulatory implications and/or technical complexities caused by, for example, pedestrians, stop lights, intersections, etc. Moreover, by handing-off transportation of a cargo item between a transfer hub and a point of origin/delivery to a driver, the systems and methods can optimize an allocation of resources to provide the vehicle transportation service, and maximize an efficiency/utilization of the fleet of vehicles.

The systems and methods described herein may also provide resulting improvements to computing technology tasked with providing a vehicle service and/or managing a fleet of vehicles to provide a vehicle service. For example, the systems and methods described herein may provide improvements in an efficiency of providing the vehicle service, and in a utilization of the vehicles for providing the vehicle service, resulting in greater throughput and reduced energy expenditure and processing requirements for computing systems.

Example Embodiments

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104, one or more remote computing systems 103 including an operations computing system 120, and a customer computing system 122. The system 100 can also include one or more additional vehicle(s) 105, each including a respective vehicle computing system (not shown).

In some implementations, the vehicle computing system 102, operations computing system 120, customer computing system 122, and additional vehicle(s) 105 can be remote from each other and communicate with each other remotely.

In some implementations, the vehicle 104 can be part of a fleet of vehicles managed by the operations computing system 120. Additionally, one or more of vehicles among the one or more additional vehicles 105 can be part of the fleet of vehicles managed by the operations computing system 120.

The operations computing system 120 can manage the vehicle 104 via the vehicle computing system 102. Additionally, the operations computing system 120 can manage the one or more additional vehicle 105 via a respective vehicle computing system. The operations computing system 120 can obtain data indicative of a service request from a customer, for example, via the customer computing system 122. The operations computing system 120 can select the autonomous vehicle 104 (or one of the additional vehicles 105) to provide the vehicle service requested by the customer. The operations computing system 120 can provide the vehicle computing system 102 with data indicative of a cargo item designated for autonomous transport, and control the vehicle 104 to provide the vehicle service.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

The vehicle 104 can include one or more sensors that can acquire sensor data indicative of one or more objects proximate to the vehicle 104, and/or indicative of one or more conditions. The objects can include, for example, pedestrians, vehicles, bicycles, attached cargo, and/or other objects. The conditions can include, for example, whether a cargo item is hitched to the vehicle 104, whether a human operator is present in the autonomous vehicle, whether one or more diagnostic checks are successfully completed, a geographic location of the vehicle 104, and/or other conditions.

The vehicle 104 can include an autonomy computing system that can obtain the sensor data from the sensors, attempt to comprehend the surrounding environment by performing various processing techniques on the sensor data (and/or other data), and generate an appropriate motion plan through such surrounding environment.

Figure 2:
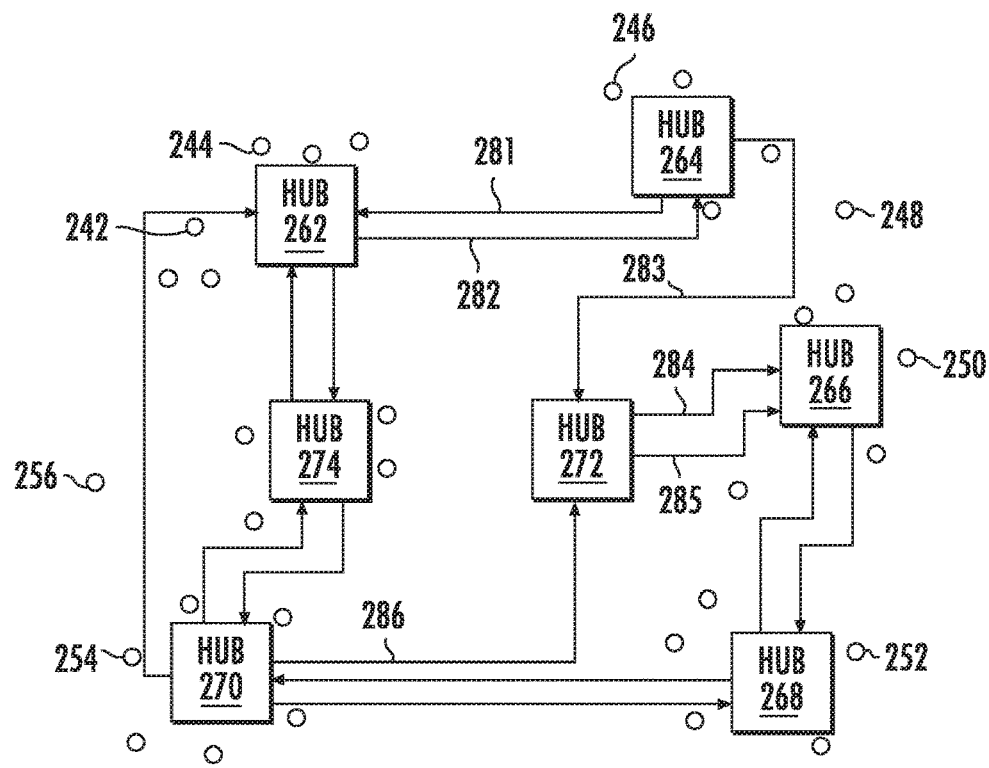
FIG. 2 depicts an example network of transportation routes according to example embodiments of the present disclosure.

FIG. 2 depicts a diagram 200 of a transportation network according to example embodiments of the present disclosure. The diagram 200 includes a plurality of transfer hubs, and a plurality of points of origin and/or points of delivery. The plurality of points can be associated with a proximate transfer hub among the plurality of transfer hubs. The plurality of transfer hubs can be linked via one or more transportation routes. In particular, the points of origin and/or delivery 242 and 244 can be associated with proximate transfer hub 262; the point of origin and/or delivery 246 can be associated with proximate transfer hub 264; the point of origin and/or delivery 248 can be associated with proximate transfer hub 264 and/or proximate transfer hub 266; the point of origin and/or delivery 250 can be associated with proximate transfer hub 266; the point of origin and/or delivery 252 can be associated with proximate transfer hub 268; the point of origin and/or delivery 254 can be associated with proximate transfer hub 270; the point of origin and/or delivery 256 can be associated with proximate transfer hub 262 and/or proximate transfer hub 270. The transfer hub 262 can be connected to the transfer hub 264 via the transportation route 281; the transfer hub 264 can be connected to the transfer hub 262 via the transportation route 282; the transfer hubs 264, 266, and 270 can be connected to the transfer hub 272 via the transportation routes 283, 284, and 286, respectively; and the transfer hub 272 can be connected to the transfer hub 266 via the transportation route 285.

Figure 3:
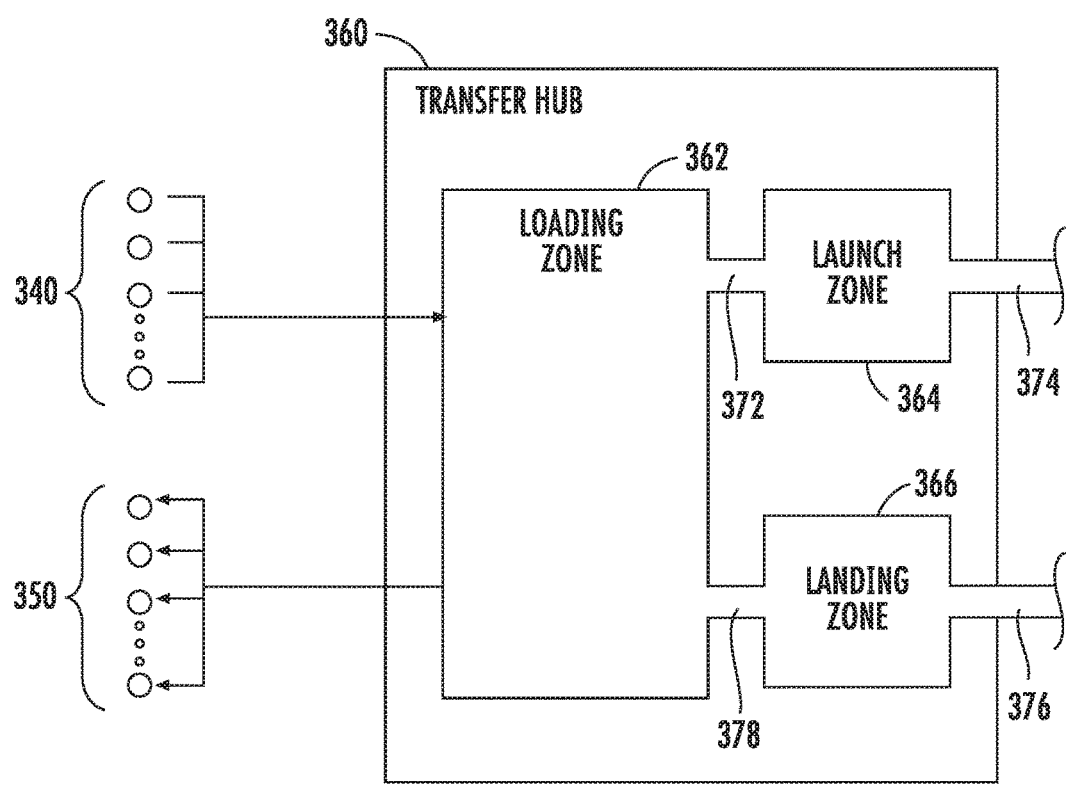
FIG. 3 depicts an example transfer hub according to example embodiments of the present disclosure.

FIG. 3 depicts a diagram 300 of a transfer hub 360 according to example embodiments of the present disclosure. The transfer hub 360 can include a loading zone 362, launch zone 364, and landing zone 366. The loading zone 362 can be accessible to one or more customer vehicles that can transport cargo between the loading zone 362 and one or more points of origin 340 proximate to the transfer hub 360 and between the loading zone 362 and one or more points of delivery 350 proximate to the transfer hub 360.

The loading zone 362 can be connected to the launch zone 364 via an access route 372, and connected to the landing zone 366 via an access route 378. The launch zone 364 can be connected to a highway via an on-ramp 374, and the landing zone can be connected to the highway via an off-ramp 376. An autonomous vehicle can exit the transfer hub onto the highway via the on-ramp 374, and the autonomous vehicle can enter the transfer hub via the off-ramp 376.

Figures 1, 4:
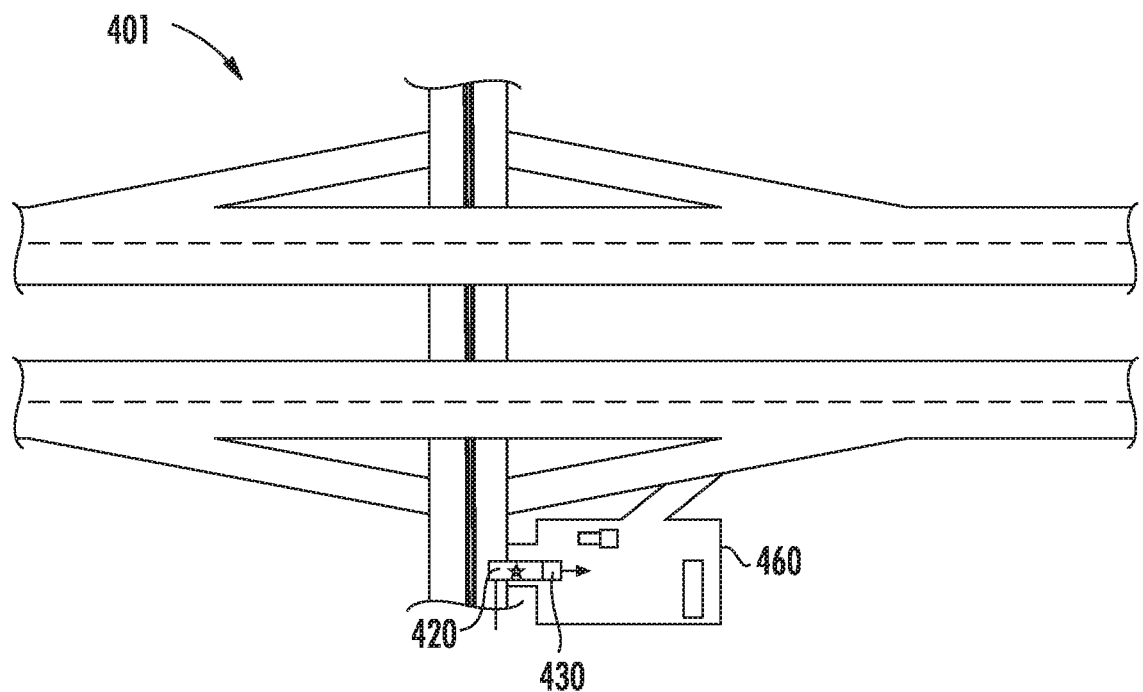
Figures 2, 4:
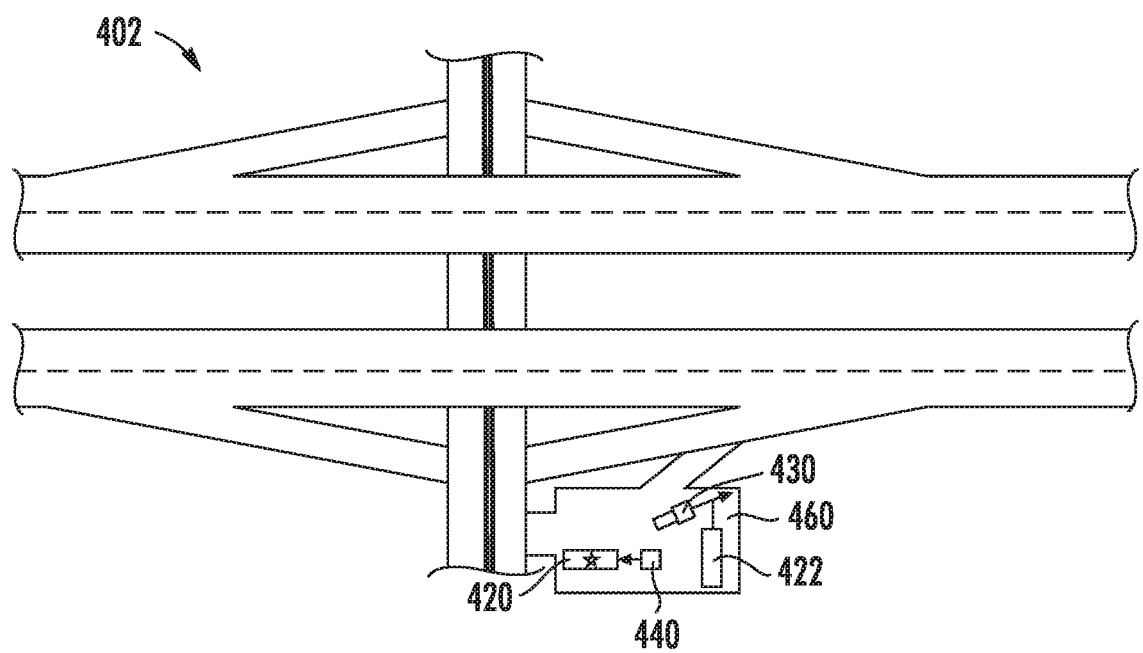
Figures 3, 4:
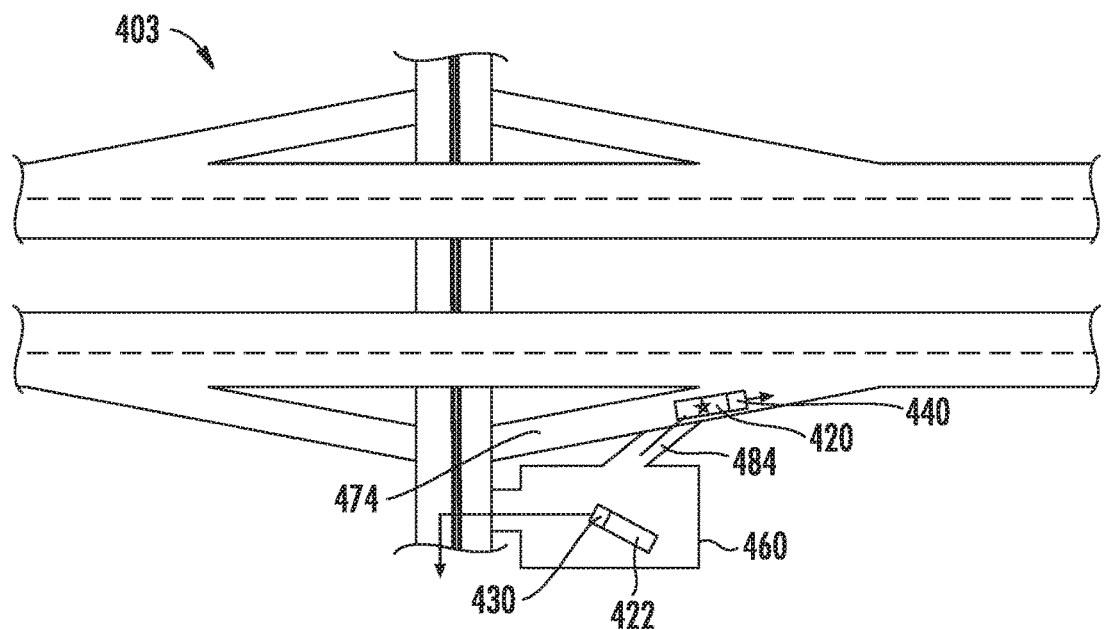
Figure 4:
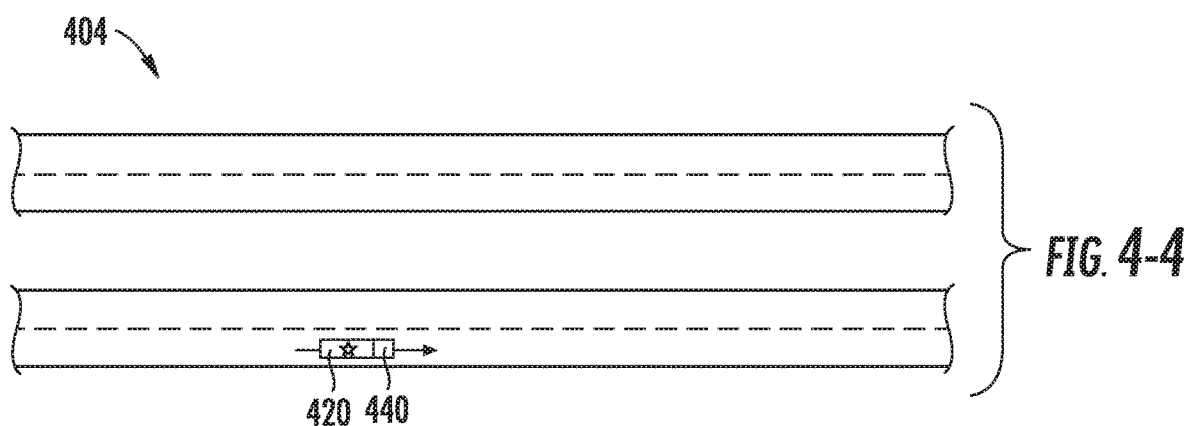

FIGS. 4-1 to 4-16 depict examples of providing a vehicle service according to example embodiments of the present disclosure. In particular, FIG. 4-1 depicts a diagram 401 that illustrates an example of a cargo item 420 (e.g., a trailer or cargo enclosure) being transported to a transfer hub 460. The cargo item 420 can be transported by a customer vehicle 430 from a point of origin of origin of the cargo item 420 proximate to the transfer hub 460.

FIG. 4-2 depicts a diagram 402 that illustrates an example hand-over of the cargo item 420. The cargo item 420 can be unhitched from the customer vehicle 430, and hitched to the autonomous vehicle 440. The customer vehicle 430 can hitch a cargo item 422 that has a point of delivery proximate to the transfer hub 460.

FIG. 4-3 depicts a diagram 403 that illustrates an example of autonomously transporting the cargo item 420 from the transfer hub 460. The autonomous vehicle 440 can exit the transfer hub 460 onto a highway via dedicated access lane 484 and an on-ramp 474. The customer vehicle 430 can transport the cargo item 422 from the transfer hub 460 to a point of delivery proximate to the transfer hub 460 via one or more local roads 490.

FIG. 4-4 depicts a diagram 404 that illustrates an example of autonomously transporting the cargo item 420 over a transportation network. The autonomous vehicle 440 can autonomously transport the cargo item 420 to another transfer hub by autonomously navigating along the highway in accordance with a transportation route.

Figures 4, 5:
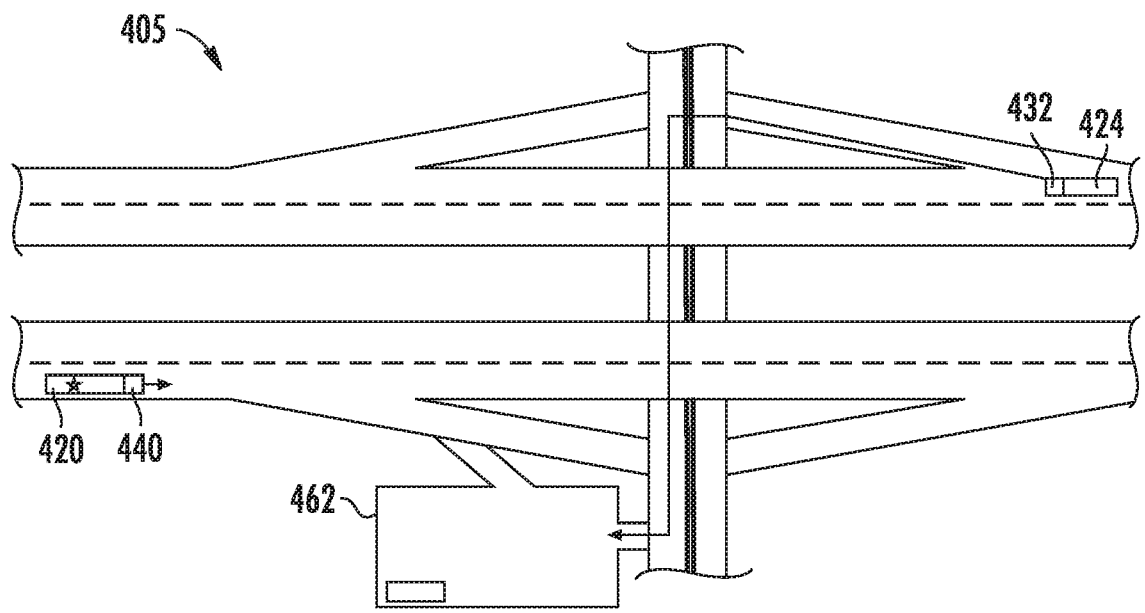

FIG. 4-5 depicts a diagram 405 that illustrates an example of autonomously transporting the cargo item 420 to the transfer hub 462. The autonomous vehicle 440 can approach the transfer hub 462 with the cargo item 420. Independent of the autonomous vehicle 440, a customer vehicle 432 can approach the transfer hub 462 with a cargo item 424. The cargo item 424 can be transported by the customer vehicle 432 from a point of origin of the cargo item 424 proximate to the transfer hub 462.

Figures 4, 5, 6:
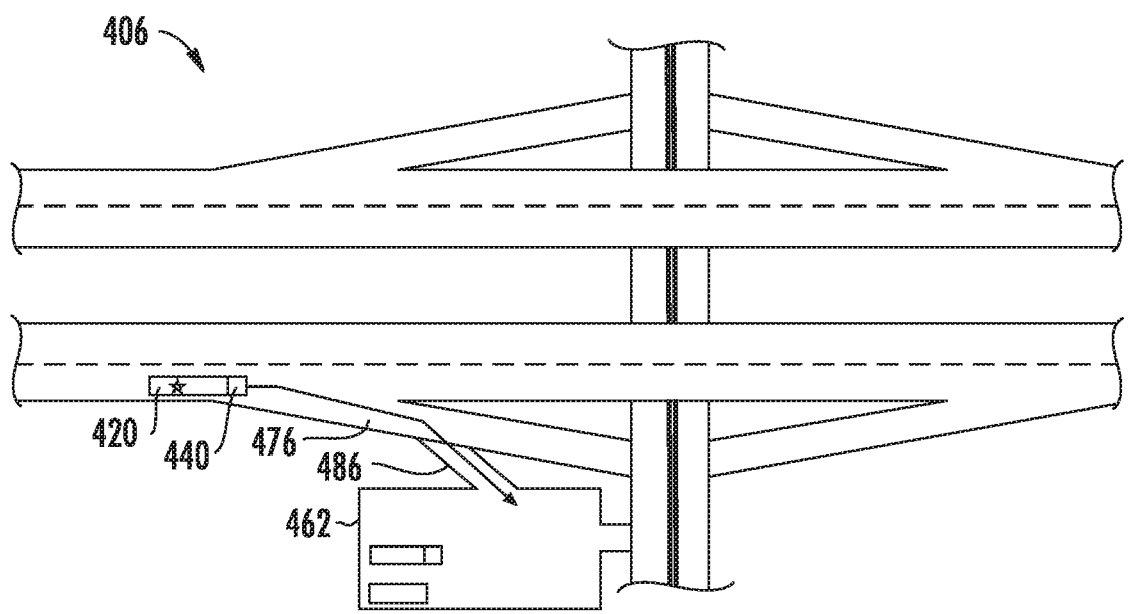

FIG. 4-6 depicts a diagram 406 that illustrates an example of autonomously transporting the cargo item 420 to the transfer hub 462 via a dedicated access lane 486. The autonomous vehicle 440 can exit the highway via the off-ramp 476, and enter the transfer hub 462 via the dedicated access lane 486.

FIG. 4-7 depicts a diagram 407 that illustrates an example of autonomously transporting the cargo item 420 to the transfer hub 462 via one or more local roads 490. The autonomous vehicle 440 can exit the highway via the off-ramp 476, and autonomously navigate to the transfer hub 462 via one or more local roads 490.

FIG. 4-8 depicts a diagram 408 that illustrates an example of autonomously transporting the cargo item 420 to the transfer hub 462 via a local route over one or more local roads 490. The autonomous vehicle 440 can exit the highway via the off-ramp 476, and autonomously navigate to the transfer hub 462 via one or more local roads 490.

FIG. 4-9 depicts a diagram 409 that illustrates an example of autonomously transporting the cargo item 420 to the transfer hub 462 via a dedicated shoulder zone 482. The autonomous vehicle 440 can exit the highway via the off-ramp 476, and pull-over at the dedicated shoulder zone 482.

FIG. 4-10 depicts a diagram 410 that illustrates an example hand-over of the cargo item 420. The cargo item 420 can be unhitched from the autonomous vehicle 440 at the transfer hub 462, and the cargo item 426 can be hitched to the autonomous vehicle 440.

FIG. 4-11 depicts a diagram 411 that illustrates an example hand-over of the cargo item 420. Pick-up of the cargo item 426. The cargo item 426 can be hitched to the autonomous vehicle 440. The cargo item 426 can be hitched to the autonomous vehicle 440, and the customer vehicle 432 can hitch the cargo item 420 that has a point of delivery proximate to the transfer hub 462.

FIG. 4-12 depicts a diagram 412 that illustrates an example of transporting the cargo item 420 to a point of delivery proximate to the transfer hub 462. The customer vehicle 432 can transport the cargo item 420 from the transfer hub 462 to a point of delivery proximate to the transfer hub 462 via one or more local roads 490.

FIG. 4-13 depicts a diagram 413 that illustrates an example of exiting the transfer hub 462. The autonomous vehicle 440 can be manually operated to drive to a launch zone 464 of the transfer hub 462.

FIG. 4-14 depicts a diagram 414 that illustrates an example of exiting the transfer hub 462. The autonomous vehicle 440 can be manually operated to drive to a shoulder zone 484 of the transfer hub 462.

FIG. 4-15 depicts a diagram 415 that illustrates an example of autonomously transporting the cargo item 426 from the transfer hub 462. The autonomous vehicle 440 can exit the transfer hub 460 onto a highway via an on-ramp 478.

FIG. 4-16 depicts a diagram 416 that illustrates an example of autonomously transporting the cargo item 426 from the transfer hub 462. The autonomous vehicle 440 can exit the transfer hub 462 onto a highway via one or more local roads 490 leading to the on-ramp 478.

FIGS. 5 and 6 depict flow diagrams of example method(s) for providing a vehicle service according to example embodiments of the present disclosure. One or more portion(s) of the methods 500 and 600 can be implemented as operations by one or more computing system(s) such as, for example, the computing system(s) 102, 103, 120, 122, 701, and 710 shown in FIGS. 1 and 7. Moreover, one or more portion(s) of the methods 500 and 600 can be implemented as an algorithm on the hardware components of the system(s) described herein (e.g., as in FIGS. 1 and 7) to, for example, provide a vehicle service. FIGS. 5-6 depict elements performed in a particular order for purposes of illustration and discussion. Those of ordinary skill in the art, using the disclosures provided herein, will understand that the elements of any of the methods (e.g., of FIG. 5, FIG. 6) discussed herein can be adapted, rearranged, expanded, omitted, combined, and/or modified in various ways without deviating from the scope of the present disclosure.

FIG. 5 depicts a flow diagram of an example method 500. At (501), the method 500 can include receiving a service request to provide a vehicle service. For example, the operations computing system 120 can receive data indicative of a service request from a customer computing system, to provide a vehicle service for a customer.

At (502), the method 500 can include determining a cargo item for autonomous transport. For example, the operations computing system 120 can determine a cargo item for autonomous transport based on the data indicative of a service request. The data indicative of a service request can include an identifier of one or more cargo items designated for autonomous transport.

At (503), the method 500 can include determining a first transfer hub and a second transfer hub for the transporting the cargo item. For example, the operations computing system 120 can determine a cargo item for autonomous transport based on the data indicative of a service request. The data indicative of a service request can include a point of origin, a point of delivery, and a current location for each cargo item designated for autonomous transport. The operations computing system 120 can determine a first transfer hub proximate to the point of origin or the current location of a cargo item, and determine a second transfer hub proximate to the point of delivery of the cargo item.

At (504), the method 500 can include determining a transportation route from the first transfer hub to the second transfer hub. For example, the operations computing system 120 can determine a transportation route from a launch zone of the first transfer hub to a landing zone of the second transfer hub.

At (505), the method 500 can include picking-up the cargo item at the first transfer hub. For example, the operations computing system 120 can control the vehicle 104, via the vehicle computing system 102, to obtain a cargo item at the first transfer hub. In particular, the operations computing system 120 can control the vehicle 104 to travel to a loading zone of the first transfer hub to hitch the cargo item, and control the vehicle 104 to travel with the cargo item to a launch zone of the first transfer hub.

At (506), the method 500 can include transporting the cargo item from the first transfer hub to the second transfer hub. For example, the operations computing system 120 can control the vehicle 104 to autonomously navigate from the first transfer hub to a second transfer hub, to transport the cargo item.

At (507), the method 500 can include dropping-off the cargo item at the second transfer hub. For example, the operations computing system 120 can control the vehicle 104 to travel to a loading zone of the second transfer hub and unhitch the cargo item.

FIG. 6 depicts a flow diagram of an example method 600. At (601), the method 600 can include obtaining data indicative of assets designated for autonomous transportation. For example, the operations computing system 120 can obtain data from a customer computing system 122 that includes one or more assets designated for autonomous transportation, and a point of origin, a point of delivery, and a current location of each designated asset.

At (602), the method 600 can include obtaining data indicative of autonomous vehicles in a fleet. For example, the operations computing system 120 can obtain status information of one of the vehicle 104 and/or one or more autonomous vehicles among the additional vehicles 105. The status information can include a location of the autonomous vehicle, and a vehicle service (if any) being provided by the autonomous vehicle.

At (603), the method 600 can include determining a first transfer hub and a second transfer hub for each asset. For example, the service provider can determine, for each asset, a first transfer hub proximate to the point of origin for the asset, and a second transfer hub proximate to the point of delivery.

At (604), the method 600 can include scheduling each asset for autonomous transportation using an autonomous vehicle. For example, the operations computing system 120 can schedule each of the plurality of assets to be transported by one of the autonomous vehicles in the fleet.

At (605), the method 600 can include optimizing an allocation of the autonomous vehicles. For example, the operations computing system 120 can adjust an allocation of the one or more assets among one or more autonomous vehicles for transporting the one or more assets, to maximize an efficiency of transporting the assets, and to maximize a utilization of the one or more autonomous vehicles in the fleet.

At (606), the method 600 can include transporting the assets from the first transfer hub to the second transfer hub. For example, the operations computing system 120 can control the vehicle 104 to autonomously navigate from the first transfer hub to a second transfer hub, to transport the cargo item.

Figures 4, 5, 6, 7:
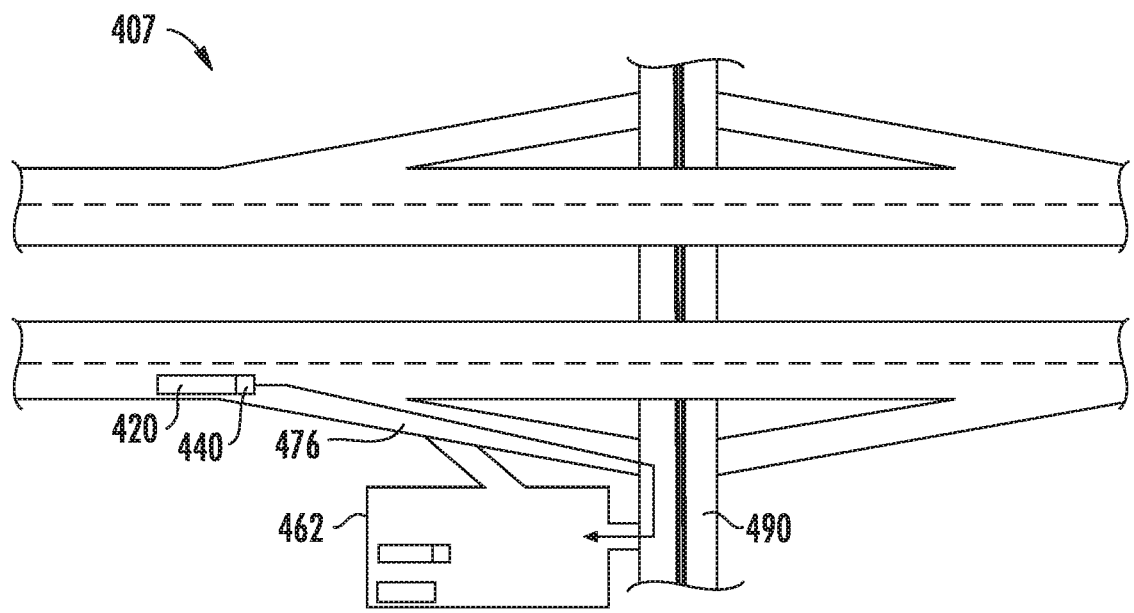
Figures 4, 5, 6, 7, 8:
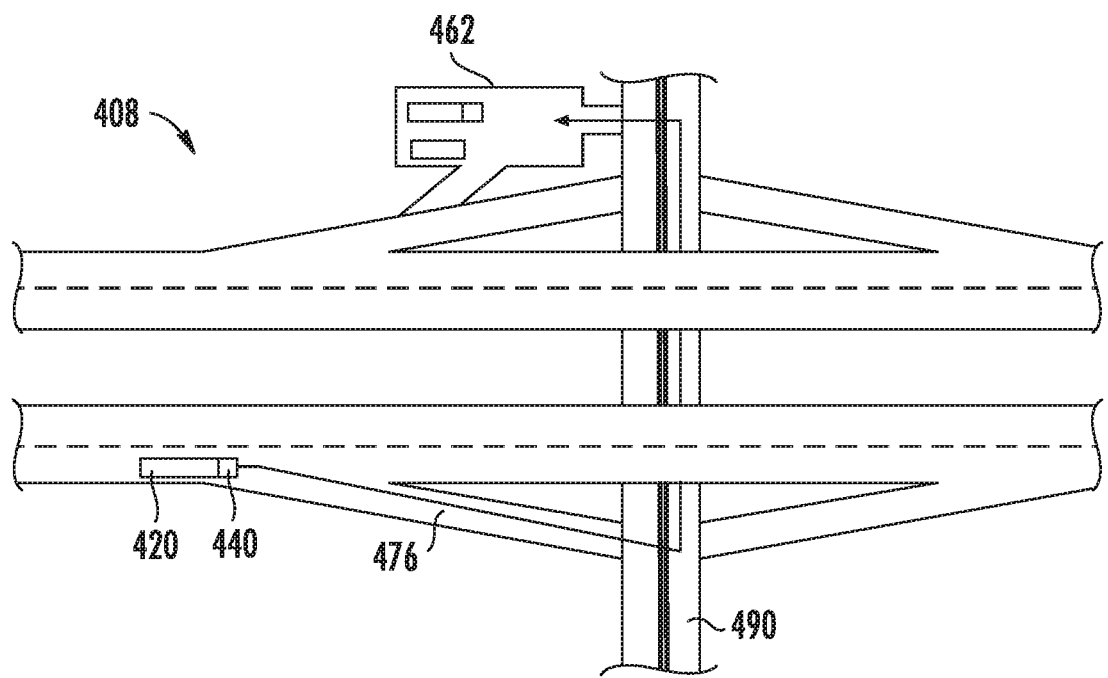
Figures 4, 5, 6, 7, 8, 9:
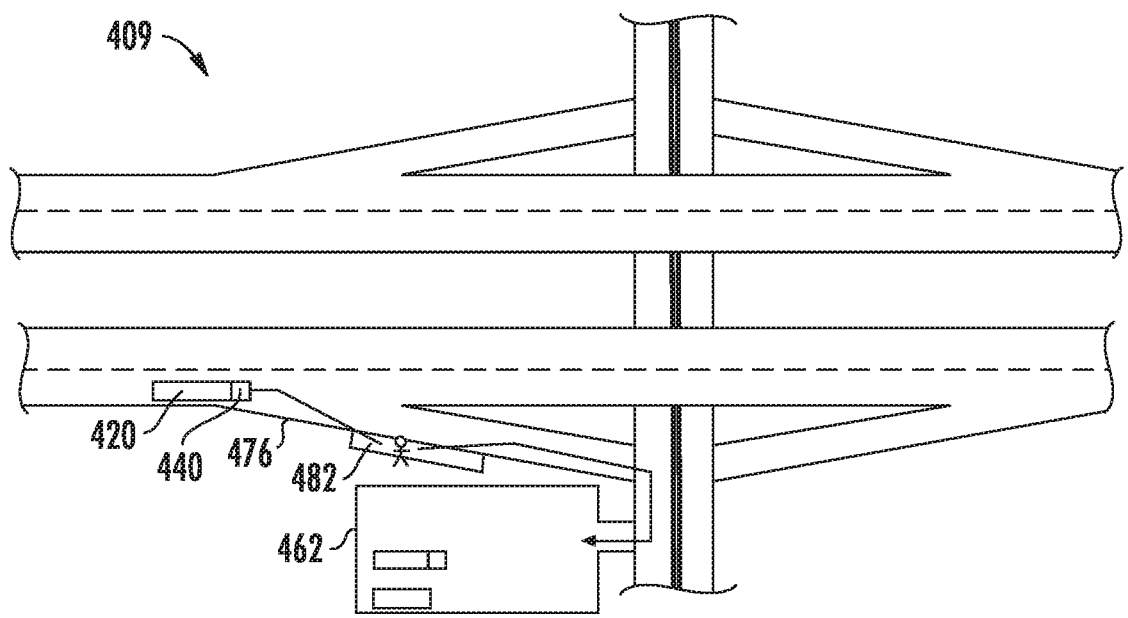
Figures 4, 5, 6, 7, 8, 9, 10:
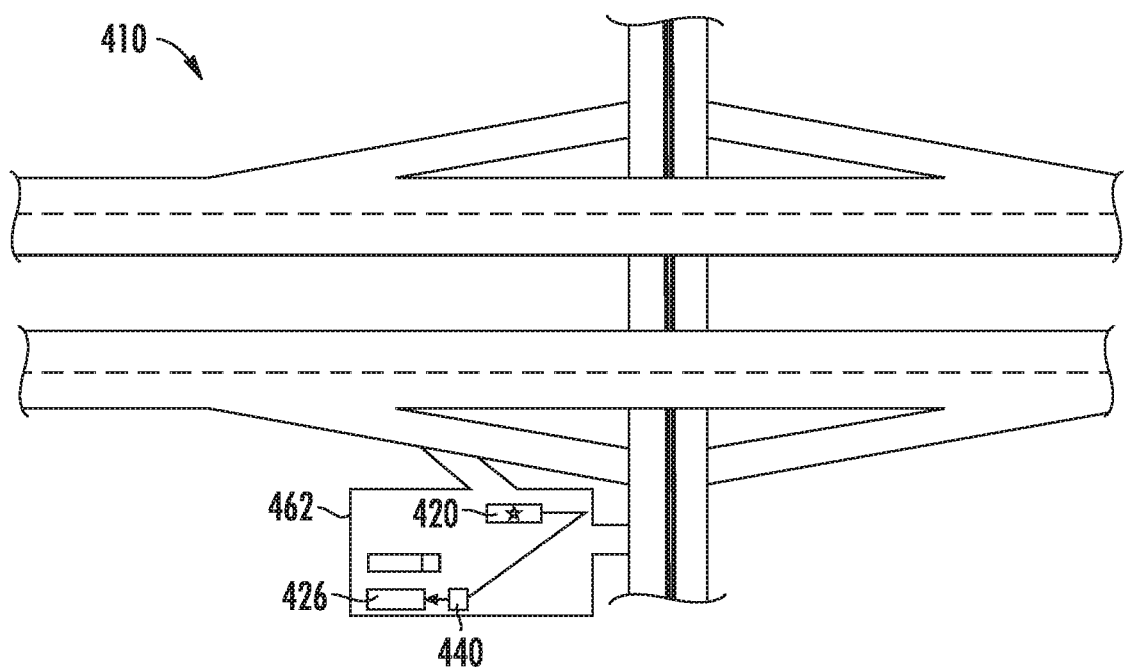
Figures 4, 5, 6, 7, 8, 9, 10, 11:
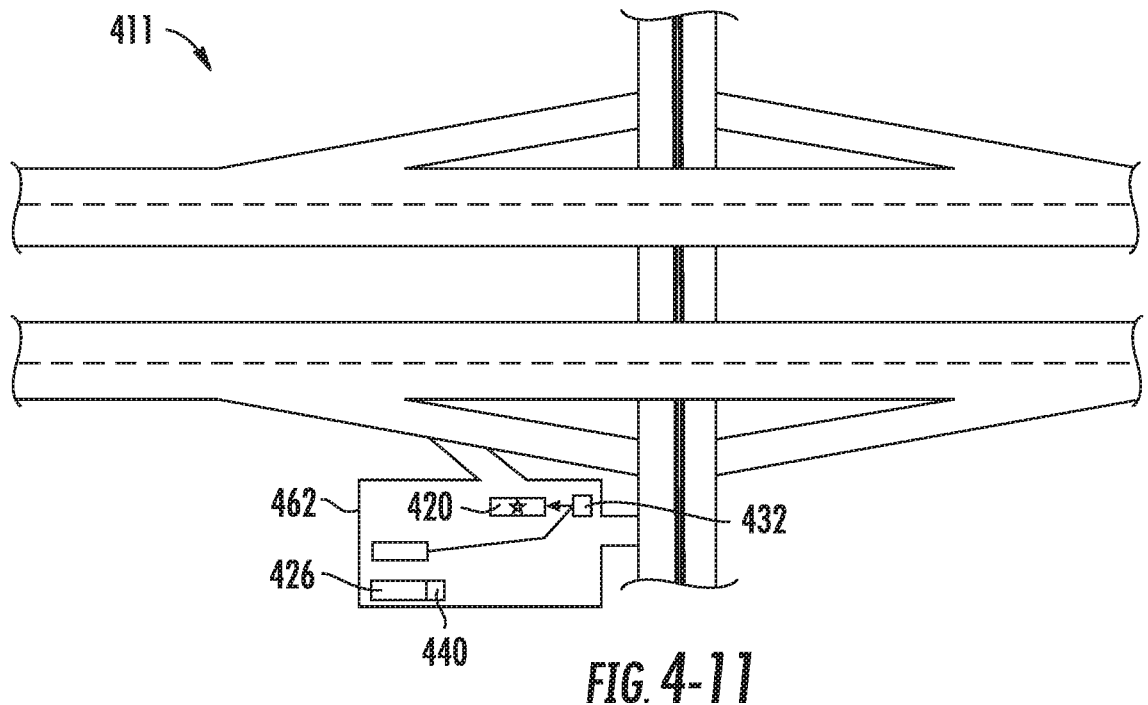
Figures 4, 5, 6, 7, 8, 9, 10, 11, 12:
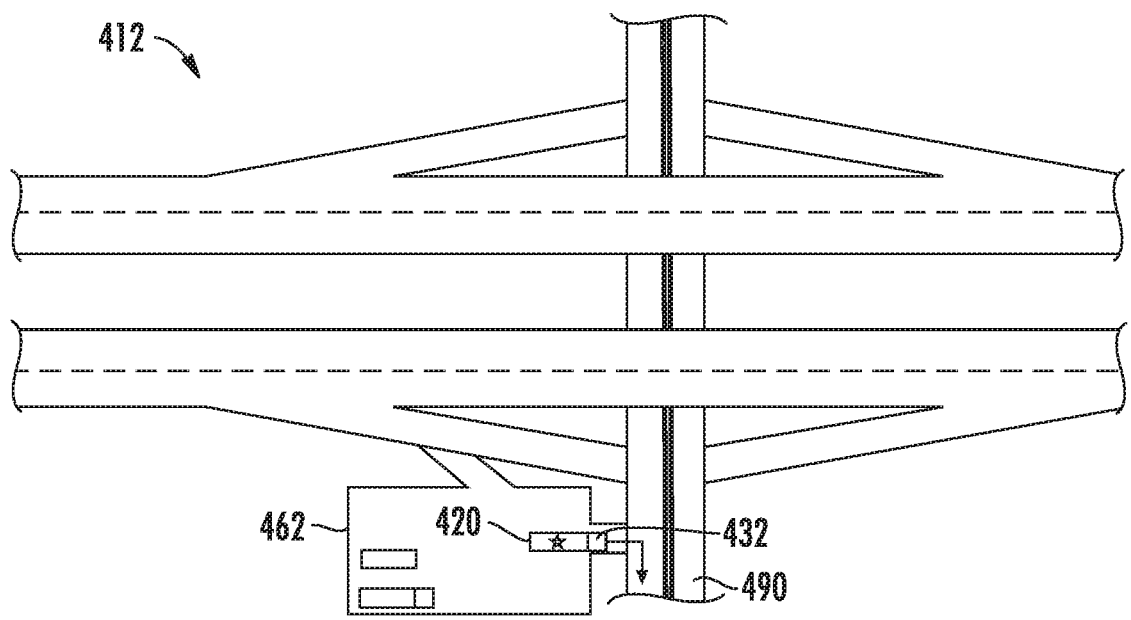
Figures 4, 5, 6, 7, 8, 9, 10, 11, 12, 13:
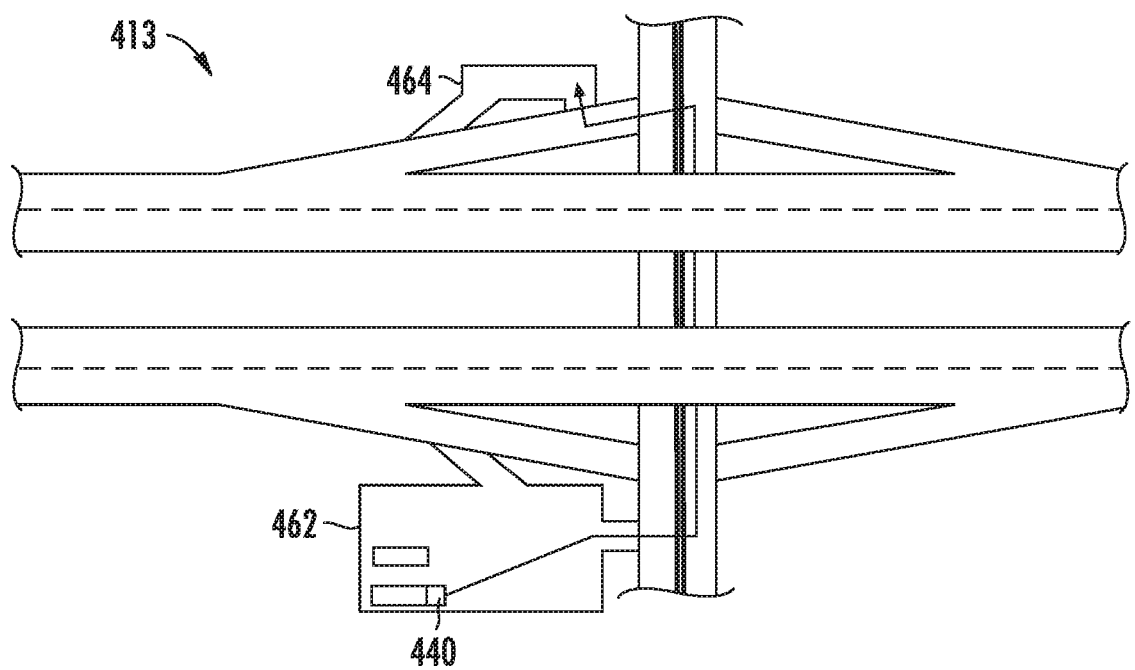
Figures 4, 5, 6, 7, 8, 9, 10, 11, 12, 13, 14:
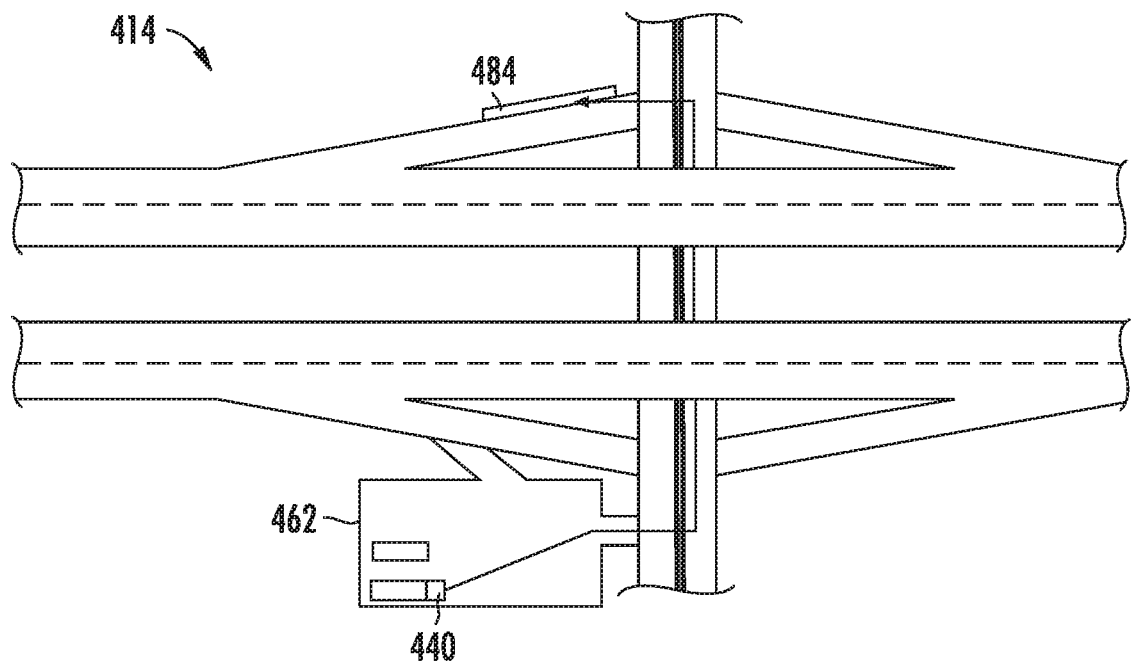
Figures 4, 5, 6, 7, 8, 9, 10, 11, 12, 13, 14, 15:
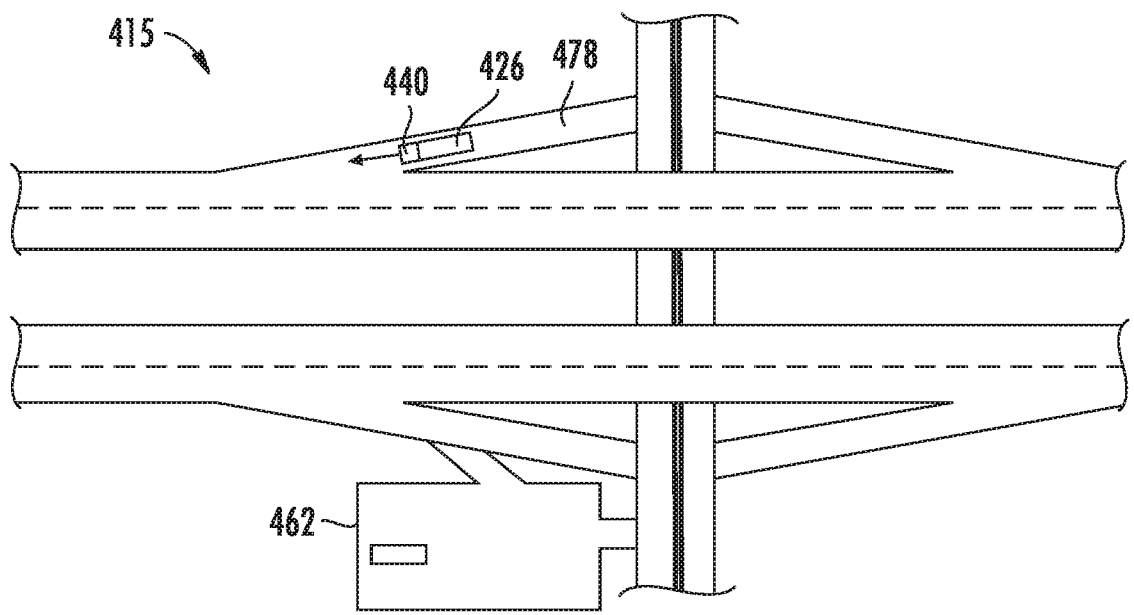
Figures 4, 5, 6, 7, 8, 9, 10, 11, 12, 13, 14, 15, 16:
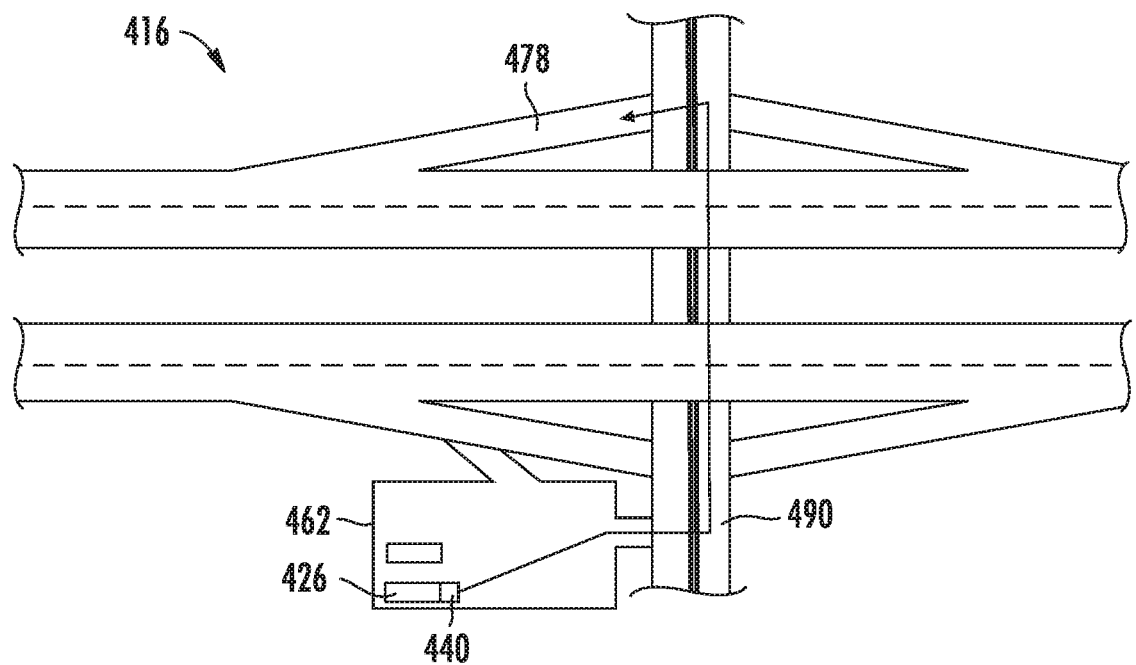
Figure 5:
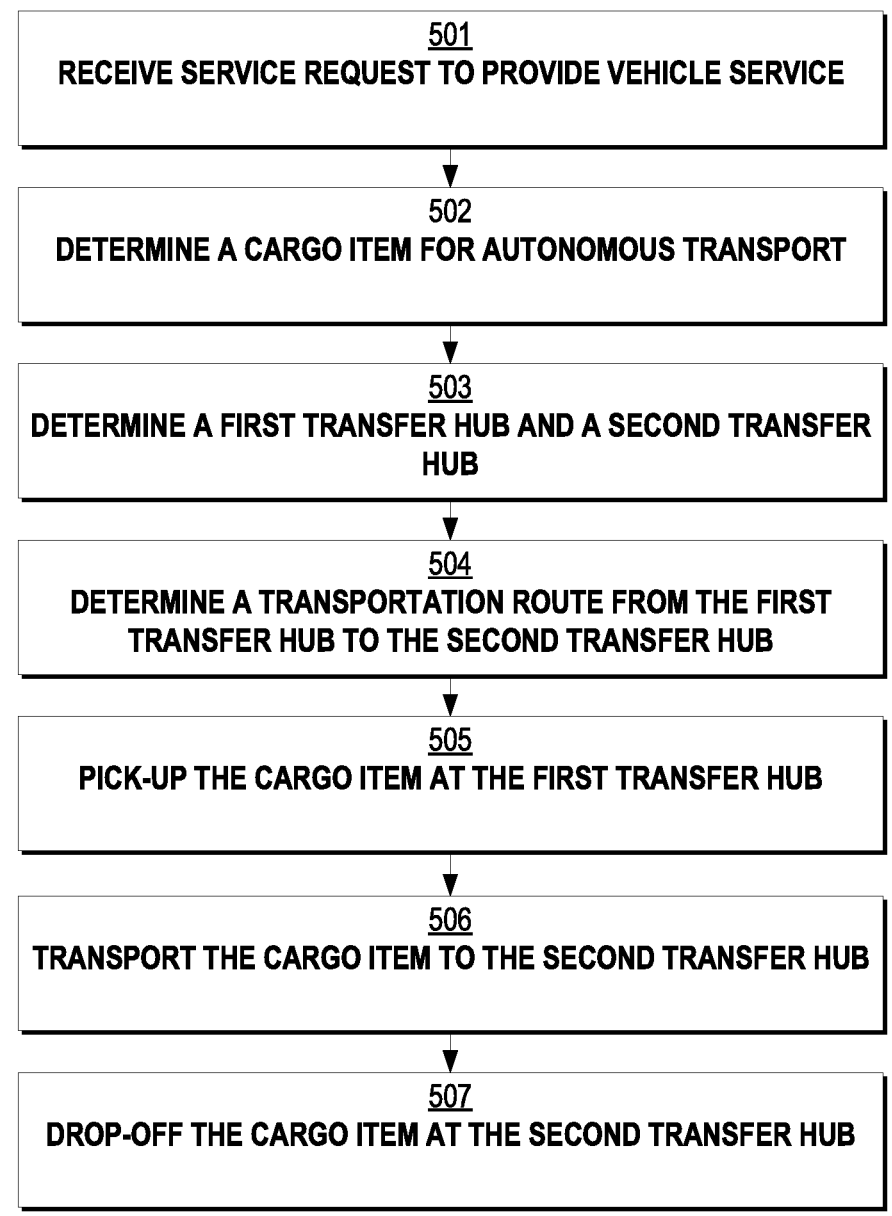
Figure 6:
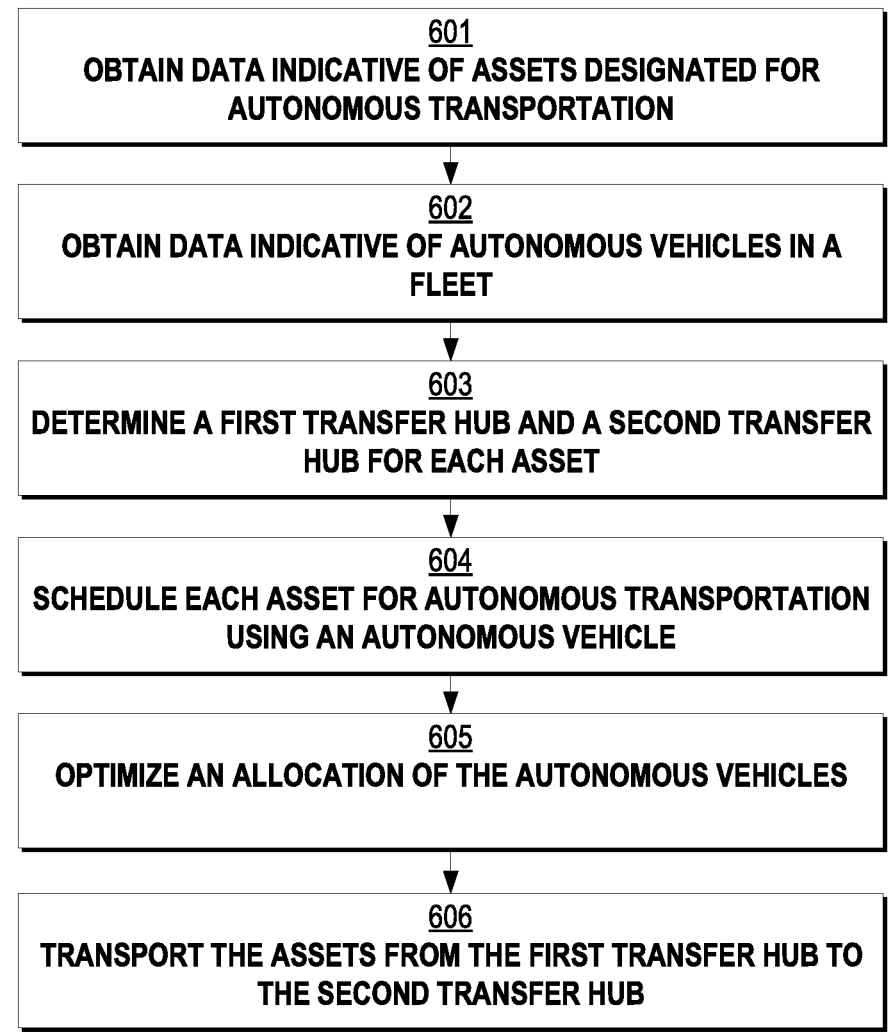
Figure 7:
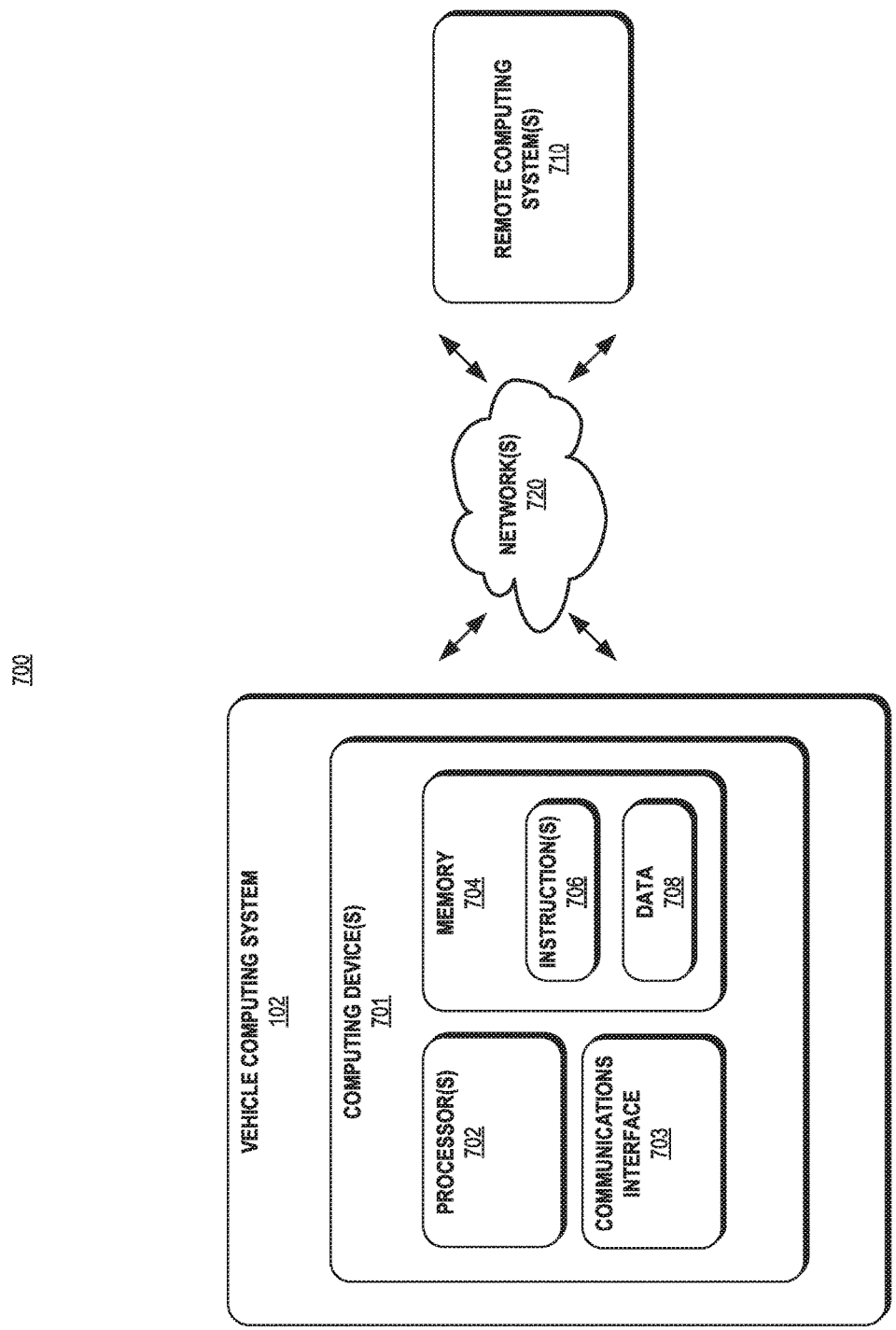

FIG. 7 depicts an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include the vehicle computing system 102 of the vehicle 104 and remote computing system(s) 710 including one or more remote computing system(s) that are remote from the vehicle 104 (e.g., the operations computing system 120) that can be communicatively coupled to one another over one or more networks 730. The remote computing system 710 can be associated with a central operations system and/or an entity associated with the vehicle 104 such as, for example, a vehicle owner, vehicle manager, fleet operator, service provider, etc.

The computing device(s) 701 of the vehicle computing system 102 can include processor(s) 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) on-board the vehicle 104 can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 104 can store instructions 706 that when executed by the one or more processors 702 on-board the vehicle 104 cause the one or more processors 702 (the vehicle computing system 102) to perform operations such as any of the operations and functions of the vehicle computing system 102, as described herein, one or more operations of methods 500, 600, and/or any other operations and functions of the vehicle computing system 102, as described herein.

The memory 704 can store data 708 that can be obtained, received, accessed, written, manipulated, created, and/or stored. The data 708 can include, for instance, data associated with perception, prediction, motion plan, transportation network, service request and/or other data/information as described herein. In some implementations, the computing device(s) 701 can obtain data from one or more memory device(s) that are remote from the vehicle 104.

The computing device(s) 701 can also include a communication interface 703 used to communicate with one or more other system(s) on-board the vehicle 104 and/or a remote computing device that is remote from the vehicle 104 (e.g., of remote computing system(s) 710). The communication interface 703 can include any circuits, components, software, etc. for communicating via one or more networks (e.g., 720). In some implementations, the communication interface 703 can include, for example, one or more of a communications controller, receiver, transceiver, transmitter, port, conductors, software, and/or hardware for communicating data.

The network(s) 720 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 720 can be accomplished, for instance, via a communication interface using any type of protocol, protection scheme, encoding, format, packaging, etc.

The remote computing system 710 can include one or more remote computing devices that are remote from the vehicle computing system 102. The remote computing devices can include components (e.g., processor(s), memory, instructions, data) similar to that described herein for the computing device(s) 701. Moreover, the remote computing system(s) 710 can be configured to perform one or more operations of the operations computing system 120, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
one or more processors; and
one or more tangible, non-transitory, computer readable media that collectively store instructions that when executed by the one or more processors cause the computing system to perform operations, the operations comprising:
obtaining data indicative of cargo, wherein the data comprises first and second locations for the cargo;
determining a first transfer hub and a second transfer hub for transporting the cargo from the first location to the second location, wherein the first transfer hub is based at least in part on the first location for the cargo and the second transfer hub is based at least in part on the second location for the cargo, wherein the cargo is delivered from the first location to the first transfer hub by a first manually operated vehicle and the cargo is received by a second manually operated vehicle at the second transfer hub; and
determining an autonomous vehicle to transport the cargo from the first transfer hub to the second transfer hub, wherein the autonomous vehicle is configured to autonomously travel from the first transfer hub to the second transfer hub to deliver the cargo to be received by the second manually operated vehicle for delivery to the second location.

2. The computing system of claim 1, wherein the first transfer hub comprises a loading zone for the autonomous vehicle and a launch zone for the autonomous vehicle.

3. The computing system of claim 2, wherein the cargo is hitched to the autonomous vehicle at the loading zone.

4. The computing system of claim 3, wherein the autonomous vehicle is moved from loading zone to the launch zone after the cargo is hitched to the autonomous vehicle.

5. The computing system of claim 1, wherein the autonomous vehicle is inspected at the first transfer hub.

6. The computing system of claim 1, wherein the computing system is remote from the autonomous vehicle and configured to communicate with the autonomous vehicle over one or more networks, and wherein the autonomous vehicle comprises an onboard autonomy system configured to obtain sensor data from at least one sensor onboard the autonomous vehicle and autonomously travel through an environment of the autonomous vehicle based at least in part on the sensor data.

7. The computing system of claim 1, wherein the first location is a point-of-origin for the cargo and the second location is a point-of-delivery for the cargo, wherein the data indicative of the cargo comprises a service request indicative of the point-of-origin and the point-of-delivery, wherein determining the first and second transfer hubs comprises:
    determining the first transfer hub based at least in part on the point-of-origin for the cargo and the second transfer hub based at least in part on the point-of-delivery for the cargo.

8. A computer-implemented method, comprising:
    obtaining, by a computing system comprising one or more computing devices, data indicative of cargo;
    obtaining, by the computing system, data associated with one or more autonomous vehicles;
    determining, by the computing system based at least in part on the data associated with the one or more autonomous vehicles, a selected autonomous vehicle to transport the cargo to a location for delivery of the cargo; and
    providing, by the computing system to the selected autonomous vehicle, data indicative of the location for delivery of the cargo,
    wherein the location comprises a transfer hub, wherein the autonomous vehicle is configured to autonomously travel to the transfer hub and the cargo is received by a manually operated vehicle at the transfer hub for delivery of the cargo to the second location.

9. The computer-implemented method of claim 8, wherein the data indicative of the cargo comprises a destination of the cargo, and wherein the method further comprises:
    determining, by the computing system, the transfer hub based at least in part on the destination of the cargo.

10. The computer-implemented method of claim 8, wherein the data indicative of cargo comprises a service request for transporting the cargo.

11. The computer-implemented method of claim 8, wherein the method comprises:
    identifying an initial transfer hub for the cargo, wherein another manually operated vehicle is to deliver the cargo to the initial transfer hub, and wherein the autonomous vehicle is to autonomously travel from the initial transfer hub to the transfer hub.

12. The computer-implemented method of claim 11, wherein an entity associated with a service request for transporting the cargo is to deliver the cargo to the initial transfer hub.

13. The computer-implemented method of claim 8, wherein the autonomous vehicle is included in a fleet of a service provider, and the manually operated vehicle is operated by a customer of the service provider.

14. The computer-implemented method of claim 8, further comprising:
    scheduling, by the computing system, the selected autonomous vehicle to transport the cargo to the transfer hub.

15. The computer-implemented method of claim 8, wherein the data associated with the one or more autonomous vehicles is indicative of a status of each of the one or more autonomous vehicles.

16. The computer-implemented method of claim 8, further comprising:
    determining, by the computing system, that the cargo has been unhitched from the autonomous vehicle.

17. The computer-implemented method of claim 8, wherein the autonomous vehicle is configured to autonomously travel to the transfer hub along a transportation route.

18. The computer-implemented method of claim 17, wherein the transportation route includes travelling on a highway.

19. One or more tangible, non-transitory, computer readable media that store instructions that when executed by one or more processors cause the one or more processors to perform operations comprising:
    obtaining data indicative of cargo, wherein the data comprises first and second locations for the cargo;
    determining a first transfer hub for transporting the cargo from the first location to the second location based at least in part on the first location for the cargo;
    determining a second transfer hub for transporting the cargo from the first location to the second location based at least in part on the second location for the cargo; and
    determining an autonomous vehicle to transport the cargo from the first transfer hub to the second transfer hub, wherein the autonomous vehicle is configured to autonomously travel from the first transfer hub to the second transfer hub to deliver the cargo.

20. The one or more tangible, non-transitory, computer readable media of claim 19, wherein the first location is a point-of-origin for the cargo and the second location is a point-of-delivery for the cargo, wherein the cargo is delivered from the point-of-origin to the first transfer hub by a first manually operated vehicle and the cargo is received by a second manually operated vehicle at the second transfer hub for transport to the point-of-delivery.

* * * * *